(12) United States Patent
Kabbes et al.

(10) Patent No.: US 9,108,686 B2
(45) Date of Patent: Aug. 18, 2015

(54) AIR GUIDE ASSEMBLY FOR VEHICLE

(71) Applicant: Honda Motor Co., Ltd., Tokyo (JP)

(72) Inventors: Ryan L. Kabbes, Delaware, OH (US);
Matthew W. Wolfe, Powell, OH (US);
Nicholas Goldsberry, Hillard, OH (US);
S. Don Gibson, Jr., Urbana, OH (US);
Michael J. Kralik, Marysville, OH (US); Jeremy Lucas, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 66 days.

(21) Appl. No.: 14/089,865

(22) Filed: Nov. 26, 2013

(65) Prior Publication Data

US 2015/0145280 A1    May 28, 2015

(51) Int. Cl.
*B62D 35/00* (2006.01)

(52) U.S. Cl.
CPC ..................... *B62D 35/005* (2013.01)

(58) Field of Classification Search
CPC . B62D 35/005; B60R 13/04; B60R 2013/646
USPC ............................. 296/35.1, 1.04, 1.08, 180.1
See application file for complete search history.

(56) References Cited

U.S. PATENT DOCUMENTS

| | | | |
|---|---|---|---|
| 3,917,332 A | 11/1975 | Puleo | |
| 4,023,823 A | 5/1977 | Saunders | |
| 4,402,537 A | 9/1983 | Gallitzendorfer et al. | |
| 4,758,034 A | 7/1988 | Ghezzi et al. | |
| 4,826,226 A | 5/1989 | Klie et al. | |
| 5,394,982 A | 3/1995 | Sawaya | |
| 5,551,589 A * | 9/1996 | Nakamura | 220/326 |
| 6,318,775 B1 | 11/2001 | Heatherington et al. | |
| 7,311,352 B2 | 12/2007 | Flotzinger | |
| 7,891,521 B2 | 2/2011 | Salice | |
| 8,015,623 B2 | 9/2011 | Lee et al. | |
| 8,267,465 B2 | 9/2012 | Wetzels et al. | |
| 8,430,447 B2 | 4/2013 | Jungert et al. | |
| 8,615,962 B1 * | 12/2013 | Perez et al. | 52/716.7 |
| 2011/0049913 A1 | 3/2011 | Bernt et al. | |
| 2011/0109122 A1 | 5/2011 | Clausen et al. | |
| 2011/0181061 A1 | 7/2011 | Hickenbottom | |
| 2012/0119532 A1 * | 5/2012 | She | 296/1.08 |

FOREIGN PATENT DOCUMENTS

| | | |
|---|---|---|
| DE | 102011119168 | 5/2013 |
| FR | 2935668 | 3/2010 |
| WO | 9002671 | 3/1990 |

OTHER PUBLICATIONS

Website: "Saab 900 Body External 1979-1994" http://www.thesaabsite.com/900old/Saab-900-body-external.html.

* cited by examiner

*Primary Examiner* — Jason S Morrow
(74) *Attorney, Agent, or Firm* — Rankin, Hill & Clark LLP

(57) ABSTRACT

An air guide assembly for a vehicle includes an air guide depending from an underside of the vehicle and an air guide extension contiguously disposed at one lateral end of the air guide. The air guide extension includes a tab received through a tab aperture defined in the air guide. The tab includes a tab feature facilitating sliding movement of the tab relative to the tab aperture due to an external force being applied to one of the air guide and the air guide extension.

17 Claims, 4 Drawing Sheets

AIR GUIDE ASSEMBLY FOR VEHICLE

BACKGROUND

Modern vehicles often include air guides or spoilers for increasing aerodynamic characteristics of the vehicle. One air guide provided on many vehicles is an underside air guide disposed laterally across a forward end of the vehicle, such as below a grill provided at the forward end of the vehicle. This type of air guide serves to increase the forward aerodynamics of the vehicle. One problem associated with such underside air guides disposed at the forward end of the vehicle is clearance relative to the ground, particularly when the vehicle is fully loaded. There are competing interests in that the clearance must be sufficient so that the vehicle can clear obstacles disposed on the ground (e.g., parking curbs) but also the clearance is desirably as small as possible to provide a better aerodynamic profile for the vehicle.

SUMMARY

According to one aspect, an air guide assembly for a vehicle includes an air guide depending from an underside of the vehicle and an air guide extension contiguously disposed at one lateral end of the air guide. One of the air guide extension and the air guide includes a tab received through a tab aperture defined in the other of the air guide extension and the air guide. The tab includes a tab feature facilitating sliding movement of the tab relative to the tab aperture due to an external force being applied to one of the air guide and the air guide extension.

According to another aspect, an underside air guide assembly provided at a front end of a vehicle includes an air guide extending laterally across the front of the vehicle and air guide extensions disposed at lateral ends of the air guide. The air guide extensions have extension front surfaces that are contiguously arranged relative to an air guide front surface of the air guide. Each of the air guide extensions or the air guide includes a tab slidably received through an aperture defined in the other of the air guide extensions or the air guide to interlock the air guide extensions to the air guide thereby inhibiting disengagement of the air guide extensions from the air guide while permitting relative movement between the air guide extensions and the air guide.

According to a further aspect, an underside vehicle air guide assembly includes an air guide and an air guide extension arranged end-to-end with the air guide. Either the air guide extension or the air guide includes a tab received through an aperture defined in the other of the air guide extension and the air guide. The tab includes a tab feature facilitating sliding movement of the tab relative to the tab aperture due to an external force being applied to one of the air guide and the air guide extension.

DETAILED DESCRIPTION

Figure 1:
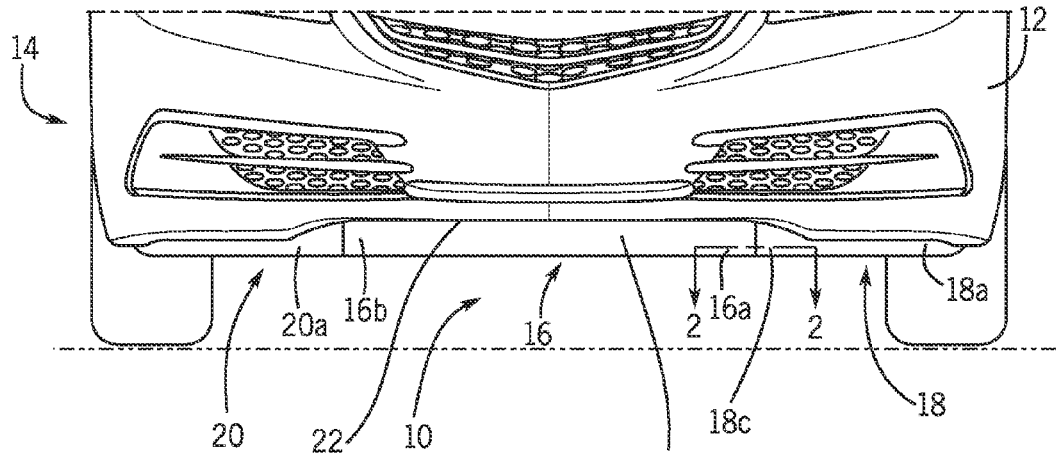
FIG. 1 is a partial front elevation view of a vehicle having an underside air guide assembly including an air guide extending laterally across the vehicle and air guide extensions disposed at lateral ends of the air guide.

With reference now to the drawings wherein the showings are for purposes of illustrating one or more exemplary embodiments and not for purposes of limiting the same, FIGS. 1-6 illustrate a known underside air guide assembly 10 provided at a front end 12 of a vehicle 14. The assembly 10 includes an air guide 16 extending laterally across the front end 12 of the vehicle 14 and air guide extensions 18, 20 disposed at lateral ends 16a, 16b of the air guide 16. Each of the air guide extensions 18, 20 is arranged end-to-end with the air guide 16, which itself depends from an underside 22 of the vehicle 14. Also, the air guide extensions 18, 20 have, respectively, extension front surfaces 18a, 20a that are contiguously arranged relative to an air guide front surface 16c of the air guide 16. Further, each of the air guide extensions 18, 20 includes a tab (e.g., tab 28 on air guide extension 18 shown in FIGS. 2-6) received through a corresponding aperture defined in the air guide 16 (e.g., tab aperture 30 defined in the air guide 16 adjacent the lateral end 16a, as shown in FIGS. 2-6) to interlock the air guide extensions 18, 20 to the air guide 16.

Figure 2:
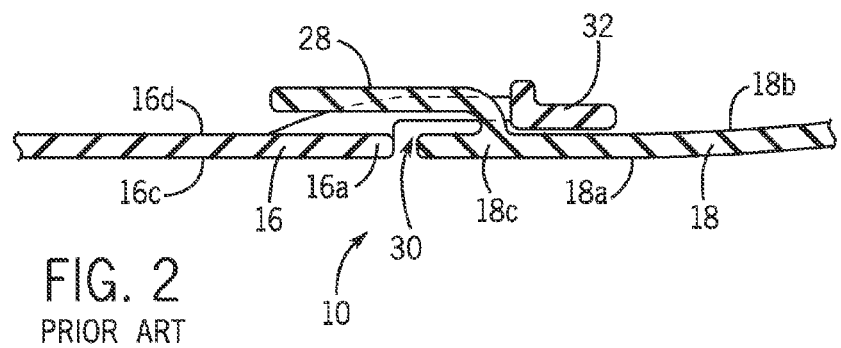
FIG. 2 is a partial cross-sectional view taken at the line 2-2 of FIG. 1 and showing a tab of one of the air guide extensions received through an aperture defined in the air guide.

The air guide extension 18 and the air guide 16, and particularly the connection between the air guide extension 18 and the air guide 16, will be described in more detail. Though not shown, it is to be appreciated and understood by those skilled in the art that a same, but mirrored, connection can be provided between the air guide extension 20 and the air guide 16 at the lateral end 16b of the air guide 16. Thus, all details discussed below concerning the air guide extension 18 and the air guide 16 at the lateral end 16a, particularly as relates to the connection between these parts, are applicable to the air guide extension 20 and the air guide 16 at the lateral end 16b, and particularly to the connection between the air guide extension 20 and the air guide 16. As shown in FIG. 2, the air guide extension 18 includes the tab 28 received through the tab aperture 30 defined in the air guide 16 at the lateral end 16a and the air guide extension 18 is contiguously disposed at the lateral end 16a of the air guide 16. That is, the air guide extension 18 and the air guide 16 are arranged in end-to-end relation so that respective front surfaces 16a, 18a are contiguously arranged to present a continuous wall at the front end 12 of the vehicle 14.

Figure 4:
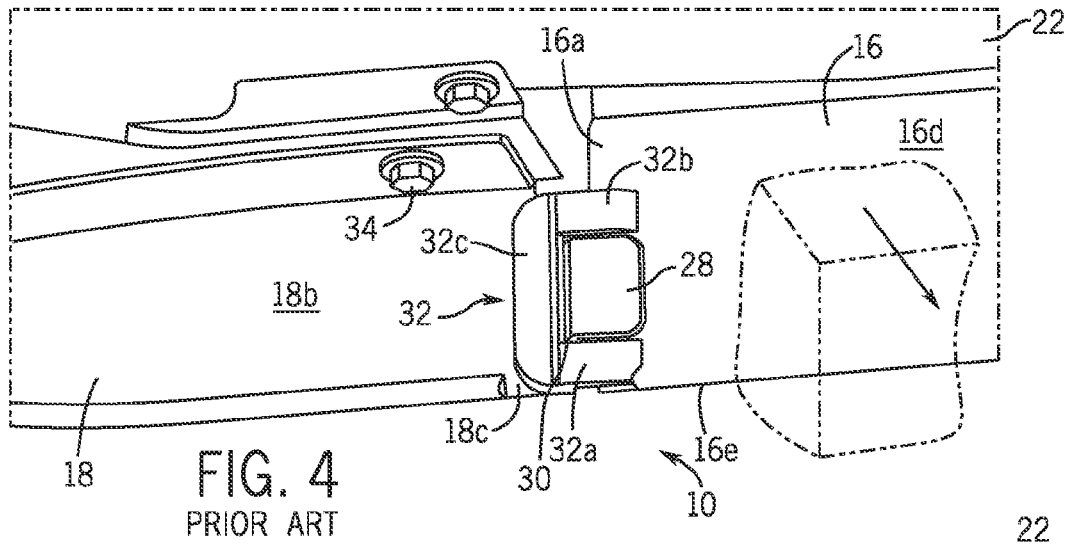
FIG. 4 is a partial perspective view taken from behind the air guide assembly and showing the same tab received through the aperture to interlock the air guide extension and the air guide.
Figure 5:
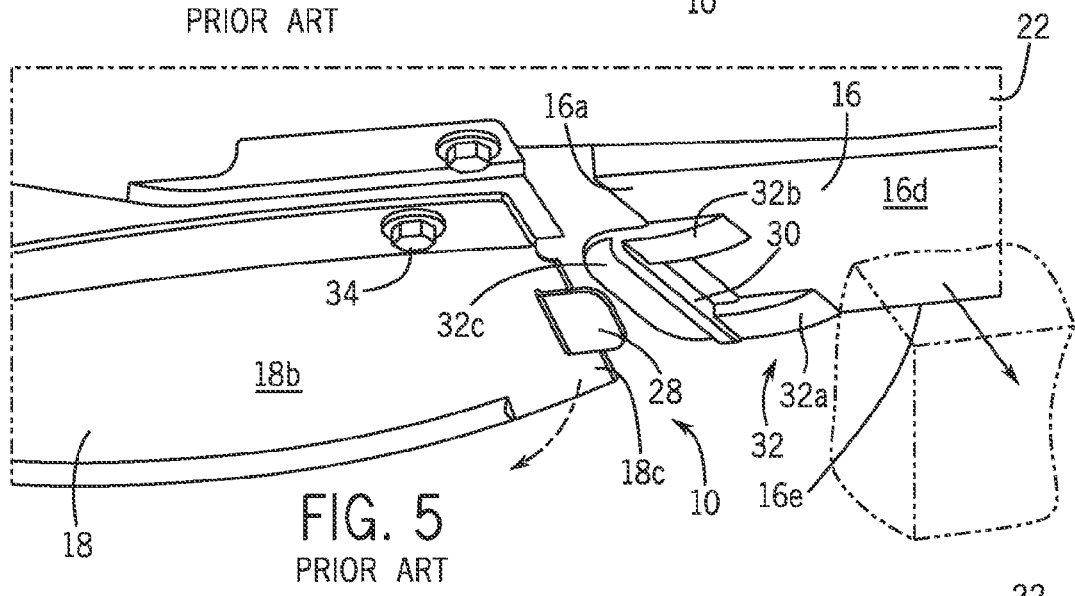
FIG. 5 is a partial perspective view similar to FIG. 4 but showing the air guide extension and the air guide disengaged and separated from one another, such as can occur when an external forwardly directed force is applied against the air guide.
Figure 6:
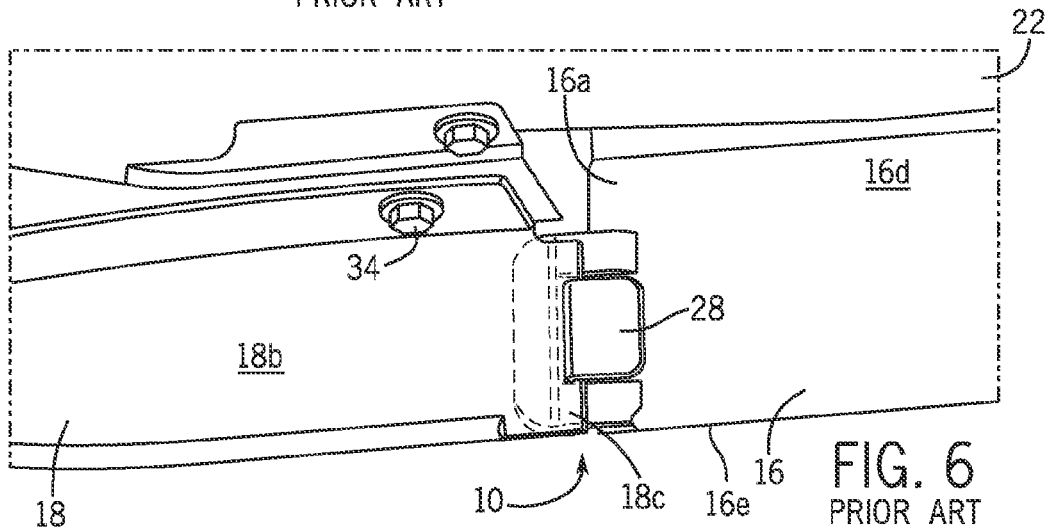
FIG. 6 is a partial perspective view similar to FIGS. 4 and 5 but showing the tab removed from the aperture as may occur after a disengagement and separation and further after the air guide and air guide extension return to their downward depending positions.

As shown, the tab 28 can project or extend from a rear surface 18b of the air guide extension 18 and can extend laterally inwardly beyond a lateral end 18c of the air guide extension 18 and overlap beyond or onto the lateral end 16a of the air guide 16 when received through the tab aperture 30 of the air guide 16. In the illustrated embodiment, the aperture 30 of the air guide 16 is defined by an air guide tab 32. As shown, the air guide tab 32 can project and extend from an air guide rear surface 16d. In particular, the air guide tab 32 can extend laterally outwardly beyond the lateral end 16a and, when the tab 28 is received through the tab aperture 30, can overlap onto the air guide extension 18 beyond the lateral end 18c of the air guide extension 18. In the embodiment illustrated, as best shown in FIGS. 4-6, the air guide tab 32 has a U-shape formed by leg portions 32a, 32b and a cross portion 32c. The leg portions 32a, 32b extend laterally outwardly from the air guide 16 and the cross portion 32c is spaced apart from the lateral end 16a so as to define the tab aperture 30 into which the tab 28 of the air guide extension 18 can be received.

As shown, the air guide extension 18 can be mounted to the underside 22 of the vehicle 14 via a suitable fastener, such as the illustrated bolt 34. Though not shown, the air guide 16 can likewise be mounted to the underside 22 of the vehicle 14 via a suitable fastener. One or both of the air guide 16 and the air guide extension 18 can be formed of a hard but flexible plastic material that enables flexing when an external force is applied against one or both of the air guide 16 and the air guide extension 18. For example, when the vehicle 14 is driven over an object on the ground, such as a parking curb (not shown), that causes the air guide 16 and/or the air guide extension 18 to contact the object, one or both of the air guide 16 and the air guide extension 18 can be flexible enough to permit bending thereof without breaking. However, one problem with this arrangement is that should such an external force be applied to only one of the air guide 16 or the air guide extension 18, separation can result. More specifically, the tab 28 can be pulled out from the tab aperture 30 and thus the air guide extension 18 can become disengaged from the air guide 16.

Figure 3:
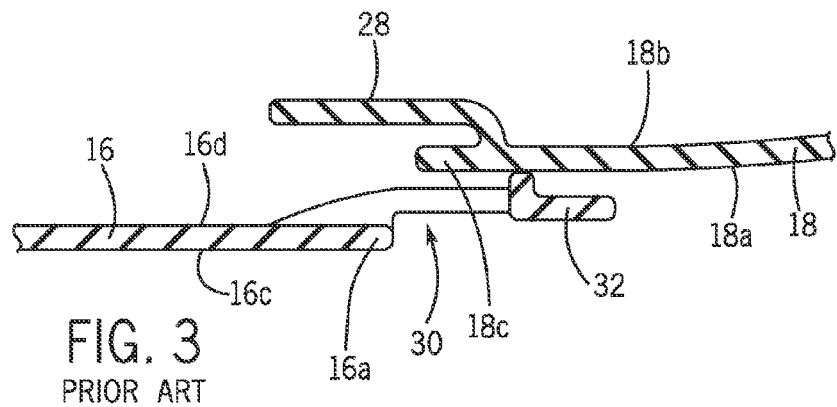
FIG. 3 is a partial cross-sectional view similar to FIG. 2 but showing the tab of the air guide extension removed from the aperture of the air guide, such as may occur when an external force is applied to the air guide.

An example of such disengagement is illustrated in FIG. 5. This could result from an external force being applied longitudinally forwardly relative to a direction of travel for the vehicle 14 against the air guide 16, but not applied against the air guide extension 18. Such an external force could be applied against the air guide 16 after the vehicle 14 is driven over an object on the ground (e.g., a parking curb) until the air guide 16 clears the object (i.e., passes beyond the object) and the vehicle 14 is then subsequently reversed so that the air guide rear surface 16d and/or a lower edge 16e of the air guide 16 contacts or engages the object and is pulled apart from the air guide extension 18 (i.e., the air guide 16 is pivoted forwardly relative to the air guide extension 18 such that the air guide tab 32 pulls away from the tab 28 of the air guide extension 18 and the tab 28 is removed from the tab aperture 30 of the air guide 16). When the external force is removed, such as when the vehicle 14 moves away from the object that caused the external force to be applied to the air guide rear surface 16d of the air guide 16, the air guide 16 can return to its normal downward depending position; however, as shown in FIGS. 3 and 6, the air guide 16 can be positioned forwardly relatively to the air guide extension 18 and the tab 28 remains removed from the tab aperture 30 of the air guide 16.

Figure 7:
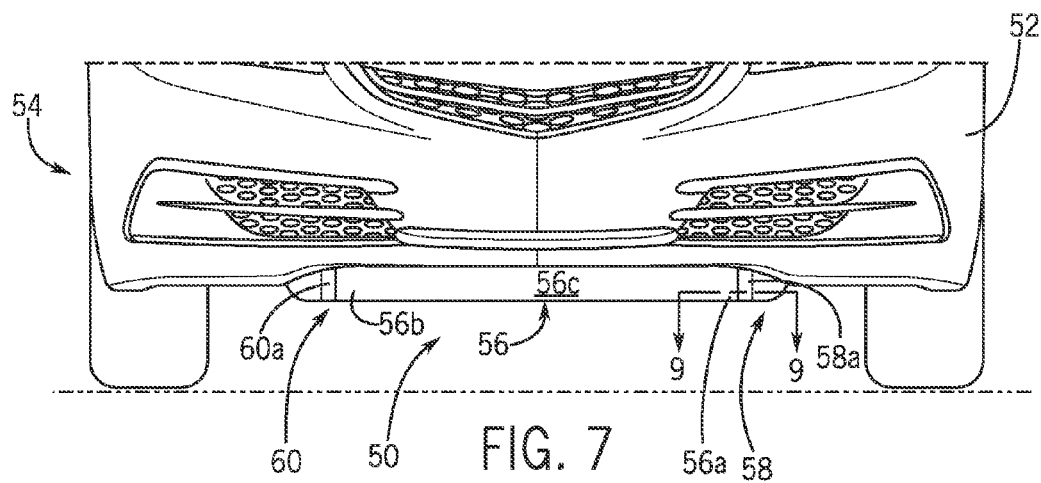
FIG. 7 is a partial front elevation view of a vehicle having an underside air guide assembly according to an exemplary embodiment with the air guide assembly including an air guide extending laterally across the vehicle and air guide extensions disposed at lateral ends of the air guide.

With reference now to FIGS. 7-11, an underside air guide assembly 50 provided at a front end 52 of a vehicle 54 will now be described according to an exemplary embodiment. Except as described herein below, the air guide assembly 50 can be the same as the air guide assembly 10 described above in reference to FIGS. 1-6. In particular, and as shown in FIG. 7, the air guide assembly 50 includes an air guide 56 extending laterally across the front end 52 of the vehicle 54 and air guide extensions 58, 60 disposed at lateral ends 56a, 56b of the air guide 56. The air guide extensions 58, 60 have extension front surfaces 58a, 60a that are contiguously arranged relative to an air guide front surface 56c of the air guide 56, which itself depends from an underside 62 of the vehicle 54. As shown, each of the air guide extensions 58, 60 is arranged end-to-end with the air guide 56. As will be described in more detail below, each of the air guide extensions 58, 60 includes a tab (e.g., tab 68 on the air guide extension 58) slidably received through a corresponding aperture defined in the air guide 56 (e.g., tab aperture 70 defined by the air guide 56 adjacent the lateral end 56a of the air guide 56) to interlock the air guide extensions 58, 60 to the air guide 56 thereby inhibiting disengagement of the air guide extensions 58, 60 from the air guide 56 while permitting relative movement between each of the air guide extensions 58, 60 and the air guide 56.

With specific reference now to FIGS. 8-11, the air guide extension 58 and the air guide 56, and particularly the connection and interlocking relationship between the air guide extension 58 and the air guide 56 will be described in further detail. Though not shown, it is to be appreciated and understood by those skilled in the art that a same, but mirrored, connection can be provided between the air guide extension 60 and the air guide 56 at the lateral end 56b of the air guide 56. Thus, all details discussed below concerning the air guide extension 58 and the air guide 56 at the lateral end 56a, particularly as relates to the connection between these parts, are applicable to the air guide extension 60 and the air guide 56 at the lateral end 56b, and particularly to the connection between the air guide extension 60 and the air guide 16.

More particularly, one of the air guide extension 58 and the air guide 56 includes a tab (e.g., tab 68) and received through a tab aperture (e.g., tab aperture 70) defined in the other of the air guide extension 58 and the air guide 56. Particular to the illustrated embodiment, the air guide extension 58 includes a tab 68 integrally formed therewith and the air guide 56 defines a tab aperture 70. The tab 68 is received through the tab aperture 70 defined in the air guide 56 at the lateral end 56a and the air guide extension 58 is contiguously disposed at the lateral end 56a of the air guide 56. That is, the air guide extension 58 and the air guide 56 are arranged in end-to-end relation so that respective front surfaces 56a, 58a are contiguously arranged to present a continuous wall the front end 52 of the vehicle 54. In one exemplary embodiment, the tab 68 includes a tab feature facilitating sliding movement of the tab 68 relative to the tab aperture 70 due to an external force being applied to one of the air guide 56 and the air guide extension 58. Alternatively, the tab 68 can be integrally formed with the air guide 56 and the tab aperture 70 can be defined in the air guide extension 58.

As shown, the tab 68 can project or extend from a rear surface 58b and the air guide extension 58 and can extend laterally inwardly beyond a lateral end 58c of the air guide extension 58 and overlap beyond or onto the lateral end 56a of the air guide 56 when received through the aperture 60 of the air guide 56. The aperture 60 can be defined in the same manner as the tab aperture 30 of the air guide 16 described in reference to FIGS. 2-6. Accordingly, the aperture 60 can be defined by an air guide tab 72 having a U-shape formed of legs portions 72a, 72b and a cross portion 72c with the air guide tab 72 projecting or extending from an air guide rear surface 56d and extending laterally outwardly beyond the lateral end 56a to overlap onto the air guide extension 58 beyond the lateral end 58c of the air guide extension 58.

The air guide extension 58 can be mounted to the underside 62 via a suitable fastener or fasteners, such as illustrated bolts 74. Though not shown, the air guide 56 can likewise be mounted to the underside 62 of the vehicle 54 via a suitable fastener (or fasteners). Like the air guide 16 and air guide extension 18, one or both of the air guide extension 58 and the air guide 56 can be formed of a hard but flexible plastic material that enables flexing when an external force is applied against one or both of the air guide 56 and the air guide extension 58, and particularly against the air guide rear surface 56d and/or a lower edge 56e of the air guide 56. For example, the air guide can be formed of a polypropylene and the air guide extension can be formed of ethylene vinyl acetate, though other material compositions could be used.

The tab feature of the tab 68 can be a stop feature that limits a degree to which the tab 68 can be slidably removed from the tab aperture 70. In particular, the stop feature can include a hooked end or portion 82 defined adjacent a distal end 84 of the tab 68 that inhibits the tab 68 from being fully removed from the tab aperture 70 and thereby inhibits disengagement of the air guide extension 58 from the air guide 56. As shown, the hooked portion 82 can be directed downwardly away from the underside 62 of the vehicle 54, particularly when no external force is applied to the air guide 56 and/or the air guide extension 58. Also as shown, the upper and lower corners 86, 88 at the distal end 84 can be chamfered. This can facilitate ease of insertion of the tab 68 into the tab aperture 70 during assembly of the vehicle 54.

In addition, or in the alternative, the tab feature can be a varying height dimension that varies in a longitudinal direction defined between a proximal end portion 90 of the tab 68 and a distal end portion 92 of the tab 68. The varying height dimension can be defined by a curved lower edge 94 of the tab 68 that defines the hooked portion 92 at the distal end portion 92 of the tab 68. More specifically, the curved lower edge 94 can define can define an underside recess 96 that defines the hooked portion 92. The curved lower edge 94 can also continuously and gradually taper inward toward an upper edge 98 of the tab 68 as the curved lower edge 94 extends from the proximal end portion 90 to the distal end portion 92 and/or toward the distal end 84 to inhibit buckling of the tab 68 when slidably moving relative to the tab aperture 70. Thus, the curved lower edge 94 is a gradually tapering lower edge that gradually tapers from the proximal end portion 90 toward the distal end 84 to inhibit buckling of the tab 68.

Figure 8:
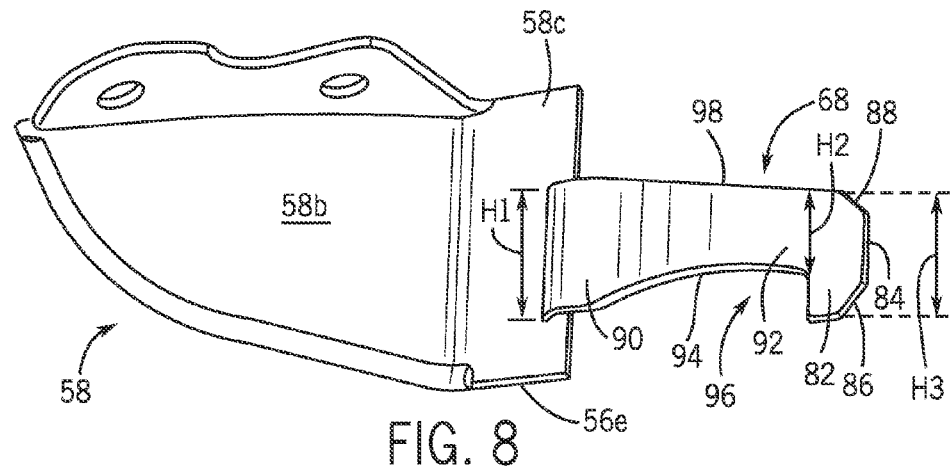
FIG. 8 is a perspective isolation view of one of the air guide extensions (i.e., the right air guide extension in FIG. 7).
Figure 9:
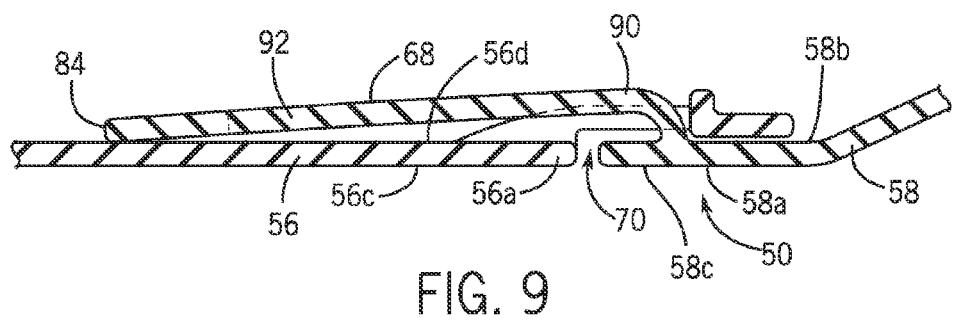
FIG. 9 is a partial cross-sectional view taken along the line 9-9 of FIG. 7 showing a tab of the air guide extension of FIG. 8 received through an aperture defined in the air guide.
Figure 10:
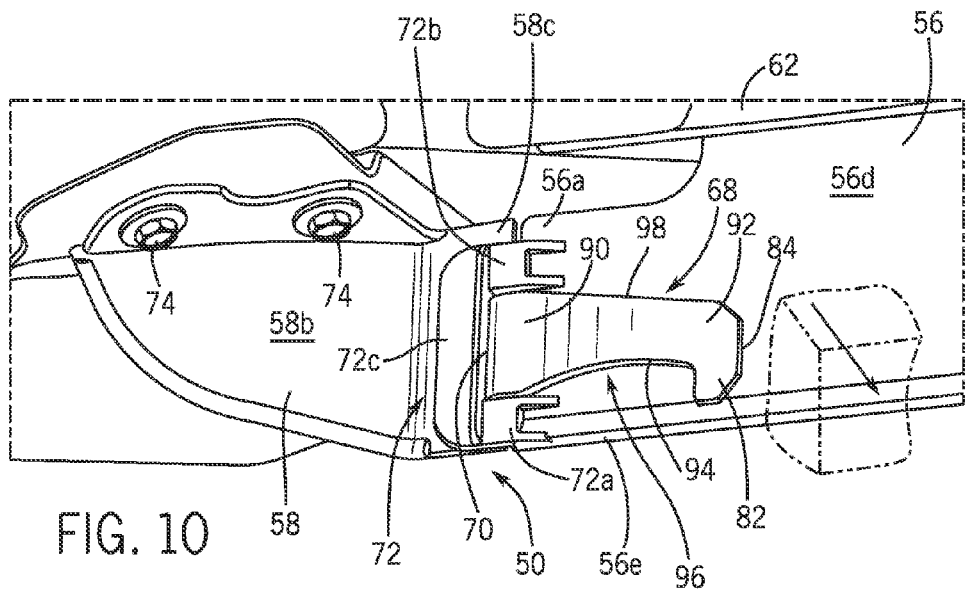
FIG. 10 is a partial perspective view taken from behind the air guide assembly and showing the same tab received through the aperture to interlock the air guide extension and the air guide.

More particularly, the proximal portion 90 of the tab 68 received through the tab aperture 70 has a proximal portion height dimension H1 (FIG. 8). In contrast, the distal portion 92 of the tab 68, which is received through the tab aperture 70 and is particularly disposed between the hooked portion 82 and the proximal portion 90, has a distal portion height dimension H2 (FIG. 8) that is less than the proximal portion height dimension H1. Moreover, the height dimension along the tab 68 gradually reduces and tapers downward from the proximal portion 90 to the distal portion 92. Such gradual tapering of the height dimension defines the recess 96 along the lower edge 94 of the tab 68. As shown, the hooked portion 82 has a hooked portion height dimension H3 (FIG. 8) that is greater than the distal portion height dimension H2 and approximately the same as the proximal portion height dimension H1.

Figure 11:
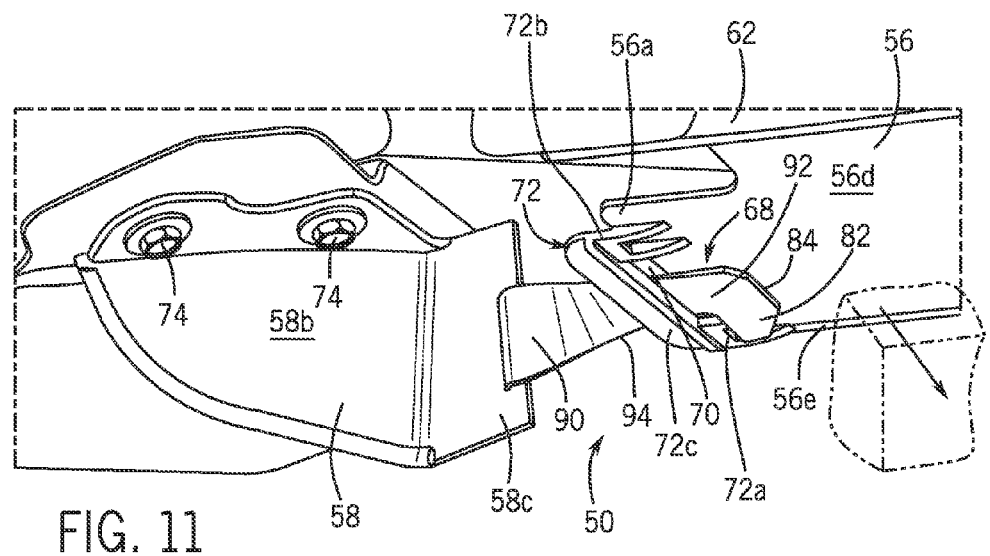
FIG. 11 is a partial perspective view similar to FIG. 10 but showing a tab feature of the tab facilitating sliding movement of the tab relative to the tab aperture, such as when an external force is applied forwardly against the air guide.

In operation, the hooked portion 82 prevents the tab 68 from being fully removed from the tab aperture 70, such as when an external force is applied against one of the air guide 56 or the air guide extension 58. For example, as illustrated in FIG. 11, when an external force is applied against the air guide rear surface 56d, as may occur after the air guide 56 is driven over a an object on the ground (e.g., a parking curb, not shown) and is driven in reverse back over the object, the air guide 56 pivots upward and forwardly away from the air guide extension 58. The hooked portion 82 functions as a stop feature to limit relative movement of the air guide 56 to the air guide extension 58. That is, the air guide 56 cannot move beyond a position defined as to when the hook 82 is immediately adjacent the tab aperture 70. Additionally, the height dimension reducing from the proximal portion 90 toward the distal portion 92 on the tab 68 further facilitates relative movement between the air guide 56 and the air guide extension 58. That is, the curved lower edge 94 permits and facilitates sliding movement of the tab 68 toward a removed direction from the tab aperture 70 and also allows the hooked end 82 to move downwardly relative to the air guide 56.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An air guide assembly for a vehicle, comprising:
   an air guide depending from an underside of the vehicle; and
   an air guide extension contiguously disposed at one lateral end of the air guide, one of the air guide extension and the air guide includes a tab received through a tab aperture defined in the other of the air guide extension and the air guide, wherein the tab includes a stop feature facilitating sliding movement of the tab relative to the tab aperture due to an external force being applied to one of the air guide and the air guide extension and limits a degree to which the tab can be slidably removed from the tab aperture, wherein the stop feature includes a hooked portion defined adjacent a distal end of the tab that inhibits the tab from being fully removed from the aperture.

2. The air guide assembly of claim 1 wherein the hooked portion is directed downwardly away from the underside of the vehicle.

3. The air guide assembly of claim 2 wherein upper and lower corners at the distal end are chamfered.

4. The air guide assembly of claim 1 wherein a proximal portion of the tab received through the aperture has a proximal portion height dimension, and wherein a distal portion of the tab received through the aperture and disposed between the hooked portion and the proximal portion has a distal portion height dimension that is less than the proximal portion height dimension.

5. The air guide assembly of claim 1 wherein a height dimension of the tab gradually tapers downward from the proximal portion to the distal portion.

6. The air guide assembly of claim 5 wherein gradual tapering of the height dimension defines a recess along a lower side of the tab.

7. The air guide assembly of claim 5 wherein a lower side of the tab includes a curved edge that gradually tapers from the proximal portion to the distal portion.

8. The air guide assembly of claim 5 wherein the hooked portion has a hooked portion height dimension greater than the distal portion height dimension and approximately the same as the proximal portion height dimension.

9. The air guide assembly of claim 1 wherein at least one of the air guide and the air guide extension is formed of a flexible plastic material that allows flexing when the external force is applied thereagainst.

10. The air guide assembly of claim 9 wherein the air guide includes the tab integrally formed therewith and the air guide extension defines the tab aperture.

11. The air guide assembly of claim 1 wherein the tab also includes a varying height dimension that varies in a longitudinal direction defined between a proximal portion of the tab and a distal portion of the tab.

12. The air guide assembly of claim 11 wherein the varying height dimension is defined by a curved lower edge of the tab that defines a hook at a distal end of the tab.

13. The air guide assembly of claim 12 wherein the curved lower edge continuously and gradually tapers toward an upper edge of the tab as the curved lower edge extends from the proximal portion of the tab to the distal portion of the tab.

14. An underside air guide assembly provided at a front end of a vehicle, comprising:
an air guide extending laterally across the front end of the vehicle; and
air guide extensions disposed at lateral ends of the air guide, the air guide extensions having extension front surfaces that are contiguously arranged relative to an air guide front surface of the air guide,
wherein each of the air guide extensions or the air guide includes a tab slidably received through an aperture defined in the other of the air guide extensions or the air guide to interlock the air guide extensions to the air guide thereby inhibiting disengagement of the air guide extensions from the air guide while permitting relative movement between the air guide extensions and the air guide, wherein the tab includes a hooked end that inhibits disengagement of the air guide extensions from the air guide.

15. The underside air guide assembly of claim 14 wherein the tab includes an underside recess defining the hooked end and gradually tapering to facilitate from a proximal end toward the hooked end to inhibit buckling.

16. The underside air guide assembly of claim 14 wherein the tab includes a gradually tapering lower edge that gradually tapers from a proximal end toward a distal end to inhibit buckling of the tab.

17. An underside vehicle air guide assembly, comprising:
an air guide; and
an air guide extension arranged end-to-end with the air guide,
either the air guide extension or the air guide includes a tab received through an aperture defined in the other of the air guide extension and the air guide, wherein the tab includes a tab feature facilitating sliding movement of the tab relative to the tab aperture due to an external force being applied to one of the air guide and the air guide extension, wherein the tab feature is a stop feature that limits a degree to which the tab can be slidably removed from the aperture and the tab feature is also a varying height dimension that varies in a longitudinal direction defined between a proximal portion of the tab and a distal portion of the tab.

* * * * *